(12) United States Patent
Lyons et al.

(10) Patent No.: US 8,572,837 B2
(45) Date of Patent: Nov. 5, 2013

(54) METHOD FOR MAKING AN EFFICIENT ROTOR FOR AN ELECTRIC MOTOR

(75) Inventors: David Lyons, Palo Alto, CA (US); Jeffrey B Straubel, Menlo Park, CA (US); Erik Shahoian, San Ramon, CA (US); Rudy Garriga, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 1624 days.

(21) Appl. No.: 11/452,793

(22) Filed: Jun. 13, 2006

(65) Prior Publication Data

US 2007/0284953 A1    Dec. 13, 2007

(51) Int. Cl.
*H02K 15/02* (2006.01)
*H02K 15/10* (2006.01)

(52) U.S. Cl.
USPC .............................. 29/598; 29/596

(58) Field of Classification Search
USPC ........... 29/598, 596; 310/42, 54, 156.34, 211, 310/260, 265
See application file for complete search history.

(56) References Cited

U.S. PATENT DOCUMENTS

| | | | |
|---|---|---|---|
| 2,033,059 A | 3/1936 | Williamson | |
| 3,924,149 A * | 12/1975 | Estrada et al. | 310/260 |
| 4,064,410 A * | 12/1977 | Roach | 310/211 |
| 6,088,906 A | 7/2000 | Hsu et al. | |

FOREIGN PATENT DOCUMENTS

| | | |
|---|---|---|
| JP | 57 028555 A | 2/1982 |
| JP | 58 003553 A | 1/1983 |
| JP | 04 004737 A | 1/1992 |
| JP | 2004 007949 A | 1/2004 |
| JP | 2004 236456 A | 8/2004 |

OTHER PUBLICATIONS

Written Opinion of the International Searching Authority, Jan. 2, 2008, 5 pages.
International Search Report, Jan. 2, 2008, 2 pages.
Finley, William R. and Mark M. Hodowanec, Selection of Copper vs. Aluminum Rotors for Induction Motors, Copyright Material IEEE, Paper No. PCIC-00-XX, 11 pages.
Supplementary European Search Report, Application No. EP 07 77 6722, May 21, 2010, 6 pages, European Patent Office.

* cited by examiner

*Primary Examiner* — Thiem Phan
(74) *Attorney, Agent, or Firm* — J. Richard Soderberg

(57) ABSTRACT

A method of making a rotor assembly for an electric motor by adding bars made out of a conducting material such as copper, to spaces between the teeth of a stack of discs, inserting bars referred to as "slugs", also made out of a conducting material such as copper, in the spaces between the bars on either side of the stack of discs, radially compressing the bars and discs, one or both of which are plated or otherwise coated with a braising material, and then heating the rotor to allow the bars to be braised to the slugs.

9 Claims, 3 Drawing Sheets

METHOD FOR MAKING AN EFFICIENT ROTOR FOR AN ELECTRIC MOTOR

FIELD OF THE INVENTION

The present invention is related to electric motors and more specifically to rotor construction in an electric motor.

BACKGROUND OF THE INVENTION

The rotor of conventional electric motors is built using a stack of laminated magnetic steel discs. The lamination prevents the flow of currents between the discs that can interfere with the efficiency of the rotor. The discs have numerous teeth radiating out from a circular portion, with spaces in between the teeth. The discs are stacked with the teeth above one another, forming a cylinder with deep grooves formed by the spaces between the teeth of the discs.

Conductors such as aluminum or copper are added to the grooves, either by inserting aluminum or copper bars into the grooves, or casting molten aluminum into the grooves. The conductors are longer than, and thus stick out from the ends of, the stacked discs. At either end, the conductors are electrically connected to one another: in the case of casting, the mold allows the connection to occur at the ends of the conductors, and in the case of bars being added, the ends of the bars can be electrically connected by inserting slugs in the spaces between the ends of the bars, and brazing the slugs to the bars using a conventional brazing technique. One such brazing technique involves melting a rod of brazing material into heated joints between the bars and the slugs, causing an electrical and mechanical connection between them.

A motor can be more efficient if the resistance between the conductors is reduced. However, the heavier the motor is, the more inertial resistance that motor will have, and so a heavier motor may not be as efficient as a lighter motor with the same dimensions. Because aluminum is lighter than copper, it has a lower inertial resistance, but because aluminum is not as good a conductor as copper, motors built from aluminum can have a higher electrical resistance than they could if they were built using an identical geometry of copper, at least partially offsetting the inertial efficiency. Offsetting the higher electrical resistance of aluminum is the fact that the interconnections can be cast with the conductors, providing only minimal resistance between the conductors. Conventional brazing techniques used for copper may not produce an electrical connection with resistance that is as low.

Cast copper could have the benefits of the lower resistance of copper, while achieving the higher conductivity of casting, but casting copper requires temperatures that could damage the laminated discs, and thus, cast copper conductors and connections between the conductors have not been frequently used in this manner. The brazing technique of electrically connecting the copper bars has a higher resistance than would result from casting, because gaps remain between the surfaces of the slugs and the bars after brazing. However, because casting copper is impractical, brazing the copper bars together to form the end rings of the rotor continues to be used.

One way around these problems with copper bars is to connect them with a single cap piece of silver-plated copper that is cast in a manner that has fins where the slugs would have been positioned, but is cast into a single piece, with connections at the ends where cast connections could have been employed had the conductors been cast instead of being made of multiple bars. The fins can be plated with braising material. The cap piece is slipped over the ends of the bars and then induction braised to the bars. However, because the fins of the cap piece must be slipped in between the bars all at the same time, the tolerances of the fins occupying the spaces between the bars can not be significantly tight, increasing the resistance of the electrical connection. Even after brazing, gaps remain between the fins and the bars because of the wide tolerances required to insert the fins in the spaces between the bars. Although the resistance between the bars of such a construction can be lower than braising, it can still be significant. Furthermore, the cast connections at the ends can add enough weight to the rotor to increase its inertial resistance, reducing the efficiency of the rotor.

What is needed is a system and method that can electrically connect the ends of copper bars added to a rotor that can lower the resistance of the electrical connection between them without the added rotational inertia of a cap piece.

SUMMARY OF INVENTION

A system and method stacks laminated, magnetic steel discs having teeth radiating outwards from a central portion of the disc, with spaces between the teeth that form a trapezoid that is nearly a rectangle, having two sides that are only slightly out of parallel.

Copper bars having approximately the same cross section as the spaces between the teeth of the discs are inserted into the cylinder formed by the stacked discs. Silver-plated copper slugs having approximately the same cross-sectional dimensions as the teeth are inserted radially, like push-pins into a pin cushion, into the spaces between the bars and above the teeth of the discs on the top, and below the teeth of the discs on the bottom.

A plate of green chromate coated stainless steel is added to each end of the assembly, above and below the slugs, and the plates are clamped towards one another using a bolt and two nuts, to axially tighten the discs against one another. In one embodiment, the nut may be tightened over a spring to allow a limited amount of thermal expansion. The green chromate coating of the plates inhibits the plate from being brazed to the slugs in the heating process described below.

In one embodiment, a radially compressible collet of green chromate coated stainless steel is added around each end of the bars and slugs and tightened via collar that surrounds the collet and is screwed towards the base of the collet over wedge shaped fins on the collet. The collar, surrounding the wedge shaped fins on the collet and tightened to itself, presses the fins towards the slugs, thereby radially compressing them in a wedging action as the collar is screwed towards the base of the collet. The collar may be tightened in either or both dimensions using a nut and an optional spring to provide a radial force to tighten the slugs into the bars while allowing for thermal expansion. In another embodiment, one or more molybdenum-alloy wires are wrapped around the assembly, near the ends of the bars and slugs, and the ends of each wire are twisted together to radially compress the bars and slugs together. The compression may occur during a heating step described below, as well as optionally before heating. In the case in which compression does not occur before the heating step, the wires are used to maintain the slugs in position relative to the bars during the heating step.

The assembly is heated in a furnace to allow the silver coating on the slugs to braise the slugs to the portion of the bars facing the slugs. As the assembly is heated, the forces, optionally spring loaded, and the limited thermal expansion of the steel pieces will ensure the slugs and bars will stay in close contact, even as the thermal expansion of them occurs, but will allow the thermal expansion to occur without failure of the assembly: the wires serve the same purpose. The close contact ensures that more of the surface of the slugs is brazed to the bars, minimizing the electrical resistance between them. The assembly is then reduced in temperature according to an annealing schedule. The green chromate stainless steel plates, collets and collars or wires, and the nuts and bolts used to cause the plates and collars to exert the clamping force, are removed.

Because the slugs are inserted radially, tighter tolerances can be achieved between the slugs and the bars, reducing the electrical resistance from that which can be achieved using a cap plate. However, without the weight of the cap, inertial resistance is lowered.

The rotor assembly can then be cooled to cause it to reduce slightly in dimension and a Beryllium copper band is heated to expand it. The band is slipped over the ends of the rotor approximately at the midpoint of the slugs. The assembly is then brought to room temperature. As the band cools, it contracts, which compresses it around the rotor, which expands as its temperature rises to room temperature. The band prevents the now annealed copper bars and slugs from deforming during the rotation of the rotor.

DETAILED DESCRIPTION OF A PREFERRED EMBODIMENT

Figure 1:
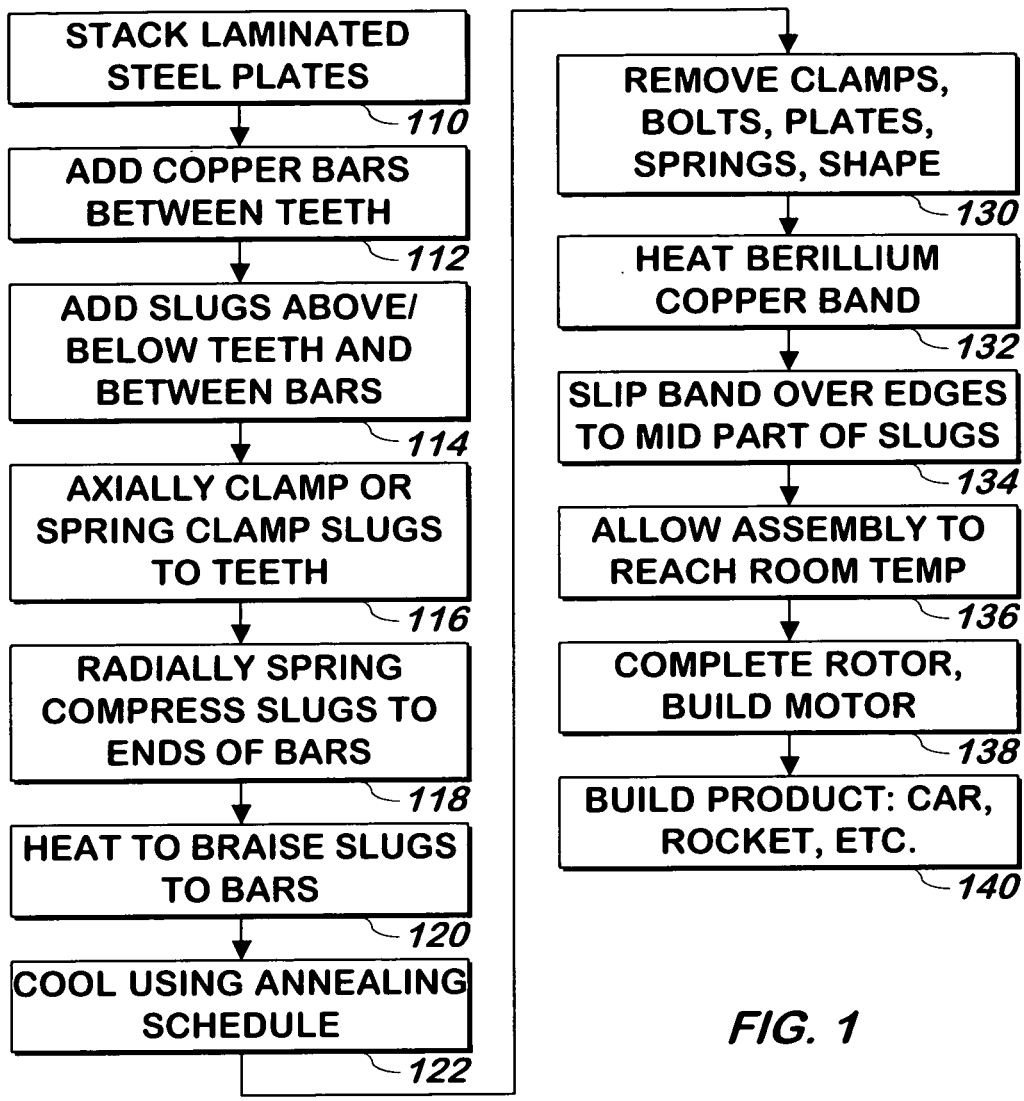
FIG. 1 is a flowchart illustrating a method of assembling an electric motor rotor according to one embodiment of the present invention.
Figure 2B:
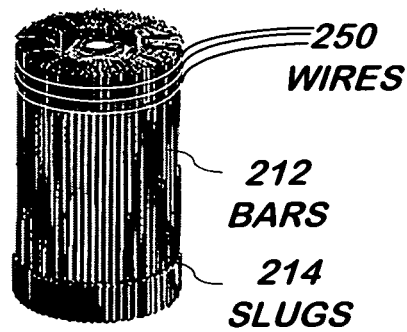
FIG. 2B is a view of the discs, bars and slugs of the rotor of FIG. 2A wrapped with wires according to another embodiment of the present invention.
Figure 2A:
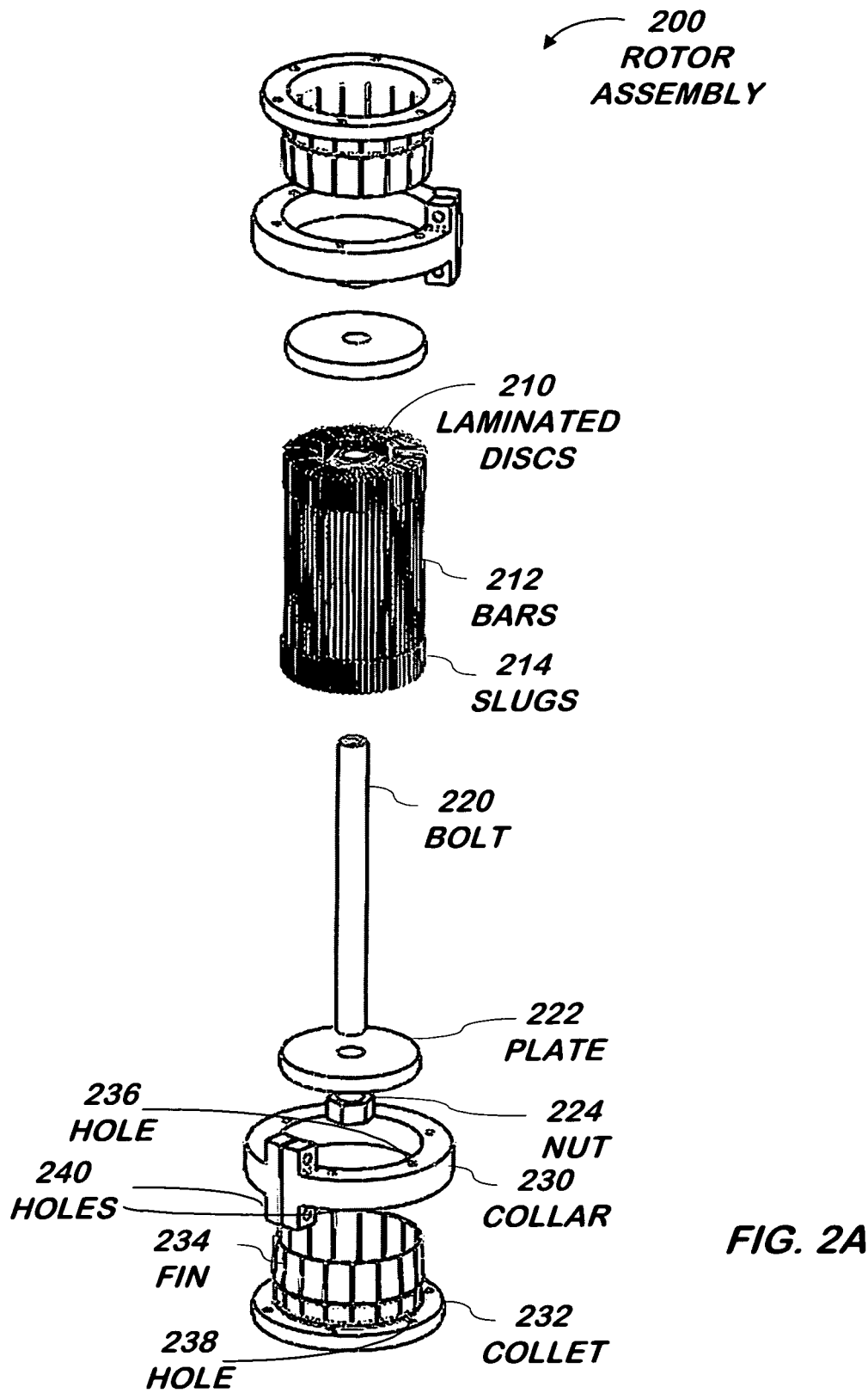
FIG. 2A is an expanded view of the electric motor rotor according to one embodiment of the present invention.
Figure 3:
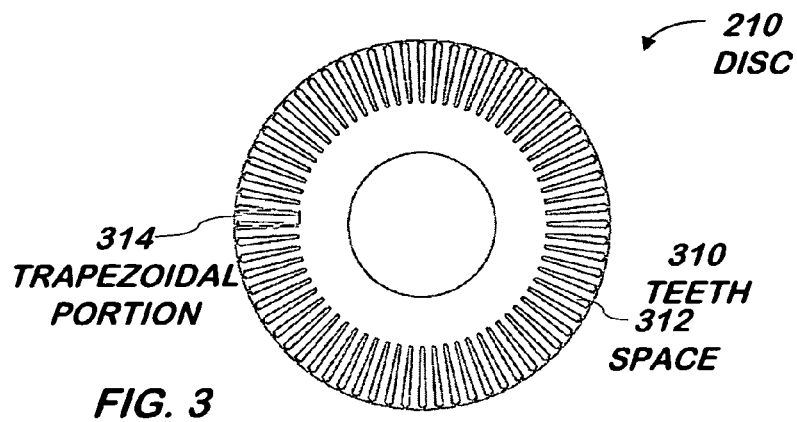
FIG. 3 is a cross sectional view of one of the discs in the stack of discs shown in FIGS. 2 and 4 according to one embodiment of the present invention.

FIG. 1 is a flowchart illustrating a method of assembling an electric motor according to one embodiment of the present invention. FIG. 2A is a diagram of an exploded view of a rotor according to one embodiment of the present invention. FIG. 2B is a diagram of a portion of the rotor of FIG. 2A according to another embodiment of the present invention. The method of FIG. 1 is described alongside the diagrams of FIGS. 2A and 2B, however, the rotor and method may be practiced independently of one another: e.g. the method of FIG. 1 may be used on a rotor different from that shown in FIG. 2A or 2B and vice versa.

Referring now to FIGS. 1, 2A and 2B, laminated steel discs 210 are stacked 110. A representative disc 210 is shown in more detail in FIG. 3. Referring now to FIGS. 1, 2A, 2B, and 3, in one embodiment, each of the discs 210 is substantially round in shape, and each of the discs has teeth 310 radiating outwards from a central portion. In one embodiment, the teeth 310 have a portion 314 forming a trapezoid that is nearly rectangular in shape, the longest sides being approximately one-half to five degrees out of parallel (e.g. 0.75 degrees), the teeth being slightly wider at the outermost edge than the width at the innermost edge of the trapezoidal portion 314. In between each of the teeth 310 are spaces 312 that form a substantially triangular shape. The discs 210 are stacked to allow the teeth 310 from adjacent discs to be aligned with one another so that the stack forms spaces 312 between each pair of adjacent teeth 310, the space 312 forming two sides of a triangle. In one embodiment, a part of each disc 210 is keyed to allow imperfections in the shape of the discs 210 to be matched by any disc above or below it. The triangular shape of the spaces 312 between the teeth 310 take up the larger circumference of the outer portion of the discs relative to their inner portions.

Bars 212 having a substantially triangular cross section (or another shape that fits in the spaces 312 between the teeth 310) are inserted 112 into the spaces between the teeth 310 of the discs 210. In one embodiment, the bars may be tapped into the stack of discs 210 using a rubber mallet. In one embodiment, the teeth 310 have T-shaped ends to hold the bars 212 in place. The bars may be made of copper or made of another material, for example, copper with silver plated ends. Each of the bars 212 is longer than the stack of discs 210, so that each of the bars 212 stick out from either end of the stack of discs 210. Between the outer ends of the bars 212, a space is formed, allowing slugs 214, described below, to be radially inserted in the spaces between the bars 212 and above and below the teeth 310 of the discs 210 in the manner described below. The spaces between adjacent bars 212 at each of their ends have a nearly square shape, with the faces of adjacent bars 212 being only a small amount out of parallel as described above, and the spaces are wider at the opening of such spaces from the outer portion of the rotor assembly 200 than the width of the spaces nearer to center of the rotor assembly 200.

Figure 4:
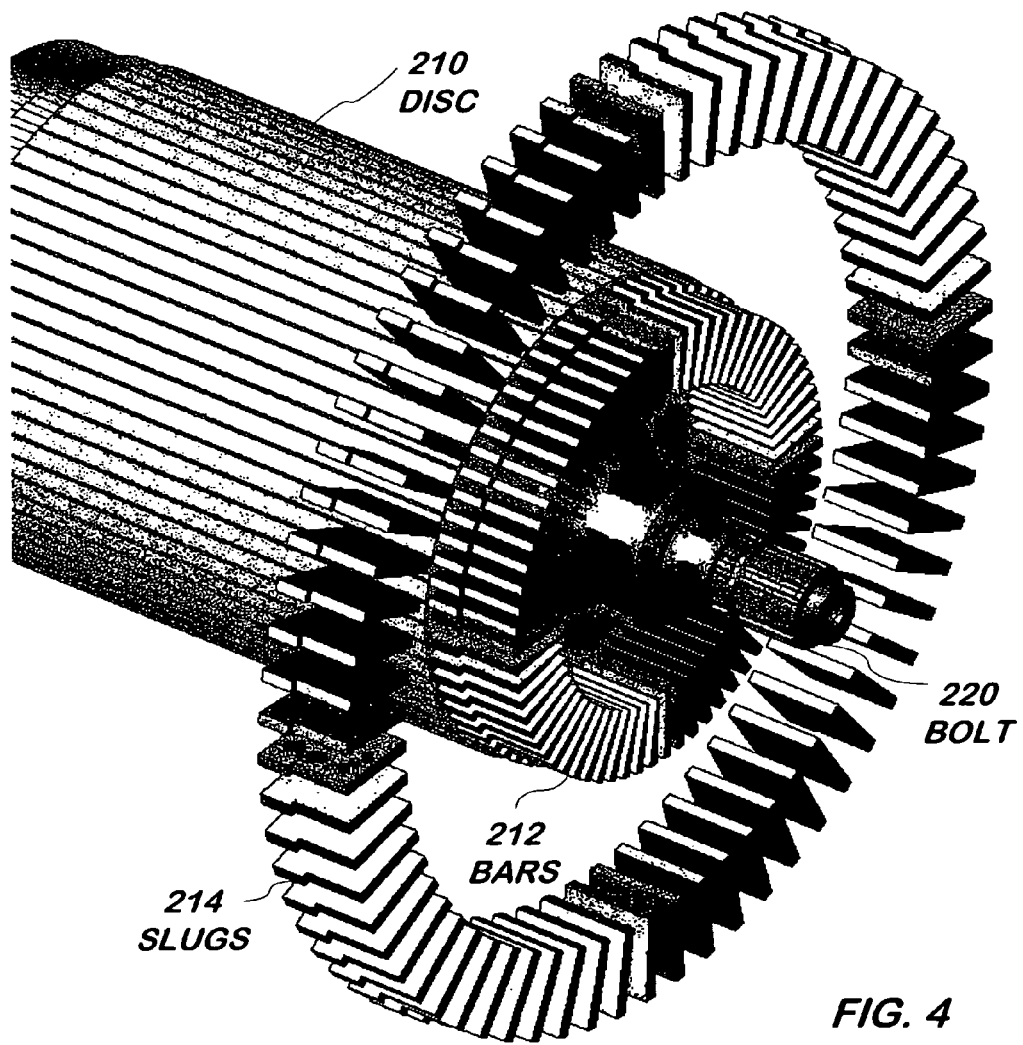
FIG. 4 is an exploded view of the electric motor rotor of FIG. 2 according to one embodiment of the present invention.

Slugs 214 having a substantially rectangular cross section or another cross section at least similar to portion 314 of teeth 310, are radially inserted 114 in the spaces between the bars above and below the teeth. As shown in FIG. 4, the slugs 214 have not yet been inserted. The slugs are inserted from their positions shown in FIG. 4 to their positions shown in FIG. 2 by pushing and optionally tapping them with a rubber mallet towards the axis of the rotor assembly 200. In one embodiment, a disc (not shown) with beveled edges that has a diameter slightly larger than the diameter of the circle defined by the inner edges of the bars 212 nearest the bolt 220 is placed over the bars 212 (and may have a hole to accept bolt 220 to properly center the disc and maintain its position) so that the beveled edge of the disc touches the inner edges of the bars 212. The slugs 214 are slightly longer than the portion of the bars 212 that extends past the stack of discs 210 so that if the slugs 214 are inserted between the bars 212 directly above or below the stack of discs 210, the slugs 214 will extend further from the discs than the ends of the bars 212. Because of this extra length, the disc with the beveled edge will serve as a stop as the slugs 214 are being tapped in towards bolt 220 to ensure that the slugs 214 are inserted uniformly, almost to the inner edge of the bars 212. The disc may be removed and another disc having a greater diameter may be placed over the top of the slugs 214 and the disc is tapped in the direction of the discs 210 to seat the slugs towards, or against, the discs 210. The same procedure may be used to insert and seat the slugs 214 on the opposite end of the rotor assembly 200. The discs 210 at each end may be used in a conventional press to press the discs towards one another, further seating the slugs 214 against the stack of discs 210.

In one embodiment, the slugs 214, like the bars 212, are made primarily of copper. A plating or coating of a braising material is made to either the slugs 214, the ends of bars 212, or both. In one embodiment, the braising material is pure silver. The plating or coating will cause the bars 212 and slugs 214 to braise to one another when the two are sufficiently heated. In one embodiment, the bars 212 are made of copper and the slugs 214 are made of copper, plated with pure silver. One advantage of this method and rotor is that the slugs 214 and the bars 212 can be extremely tight-fitting: because the slugs can be inserted fewer than all at the same time (e.g. one at a time), the full force of insertion can be devoted to the fewer than all slugs being inserted, whereas a cap piece with fins requires all of the fins to be inserted simultaneously. Because all of the fins are inserted simultaneously, the force of insertion delivered to each one is less than all of the force, and the tolerances are made larger to accommodate the lack of available force of insertion.

In contrast to conventional rotors using cap pieces, the slugs 214 are not mechanically or electrically attached to one another before they are pushed into the spaces between the bars. The slugs 214 may, however, be mechanically or electrically attached, however, doing so would have little functional value. Thus, mechanical or electrical attachment of the slugs 214 to one another via some mechanism other than a conventional cap plate and that would enable the slugs 214 to be pushed axially into the rotor assembly 200 is permitted, but not required.

An optionally thermally-expandable force is applied 116 to the ends of the slugs 214 towards the center of the rotor assembly 200 to press the ends of the slugs 214 against the outer faces of the nearest disc 210 at each end of the stack. To apply such a force, in one embodiment, a green chromate coated stainless steel plate 222 is slipped over bolt 220 running along the axis of the stack of discs 210 and extending beyond the tips of the slugs 214 and bars 212. The green chromate coating may be replaced with any coating that will help prevent the piece coated from brazing to the slugs 214, bars 212 or any other portion of the rotor assembly 200 and need not actually be a green color. A nut 224 is tightened over the plate 222 using the bolt 220. The plate 222 is used to distribute the force across the edges of the slugs 214 and bars 212. A spring (not shown) is optionally placed between the plate 222 and the nut 220 at each end to allow for thermal expansion of rotor assembly 200, though other means of doing so, such as by using a bolt 220 with an approximately equal or slightly lower coefficient of thermal expansion than the remaining portion of rotor assembly 200 may be used. This same arrangement is used on the other end of the rotor assembly 200. The force is thus axially applied from the ends of the rotor assembly 200 towards its center.

An optionally thermally-expandable force is applied 118 radially, from outside the slugs 214 towards bolt 220. The force may be applied in such a manner that it is present before and during the heating of the slugs 214 or it may be applied in a manner that causes it to be present when the slugs are heated, but not before, or the force may be very light before the slugs are heated but may increase as the slugs are heated if the application of the force is via one or more components that have a lower coefficient of thermal expansion than the remainder of assembly 200. The force is applied in a manner that allows for it to be removed at a later time.

In one embodiment, the force is applied by the use of a removable collet 232 made of green-coated stainless steel, and a collar 230 at either end of the rotor assembly 200. The collet 232, with the collar 230 slipped over it, is slipped over the slugs 214 and the ends of the bars, and screws are inserted into holes 240 and tightened with bolts. The collar 230 is tightened together with the collet 323, using one or more bolts and nuts through holes such as hole 236 and hole 238. The collar 230 and collet 232 are shaped in such a manner that causes them, when tightened in this manner, to compress the slugs 214 towards bolt 220. The collet 232 and collar 230 distribute the force of the tightening inward towards bolt 220 without adding torque to pull the slugs 214 or bars 212 out of position. Alternative solutions such as clamps could distribute the force inwards towards bolt 220 but could torque the slugs 214 or bars 212 in a circular fashion, which could provide a less-tight connection between one of the faces of slugs 214 and bars 212. The compression used has the effect of forcing both faces of the slugs 214 against the faces of the bars 212 to tighten them during the brazing process described below, for a higher conductivity between their faces.

In one embodiment, the collet 232 contains fins such as fin 234 that have a wedge shape. That is, the part of the fins 234 contacting the collar 230 get thicker between the face that faces the slugs 214 and the opposite face at the base of the fins 234 as the screws tightening the collar 230 are tightened. The effect is to provide a "radially wedging" effect that provides the radial force. A radially wedging effect is the application of a radial force caused by a wedge shaped piece sliding over another piece or being slid over by another piece. This radial force is centrally-directed, that is directed inward towards the axis of bolt 220.

In one embodiment, the bolts used to tighten the collar 230 and collet 232 are tightened against a spring to allow the collar 230 to expand slightly in response to the thermal expansion of the bars 212 and slugs 214. Other means of accommodating thermal expansion may be used.

In one embodiment, instead of a collar/collet arrangement as described above, the force applied to the slugs 214 to tighten them against the bars 212 consists of one or more molybdenum alloy wires 250 (shown on FIG. 2B in white) wrapped around the outer edges of the slugs 214. In one embodiment, four wires 250 are used, but other embodiments may use other numbers of wires 250. The two ends of each molybdenum wire 250 are twist tied to one another, and the ends of the wires 250 may be cut off from the twisted portion. The one or more wires provide the force, and the molybdenum alloy provides for a limited amount of thermal expansion. As noted above, the force need not be particularly strong or exist at all until the assembly is heated. For example, the wires 250 may be only relatively loosely tied around the slugs 214, providing little force until the slugs 214 are heated, although in other embodiments, the wires 250 apply force both before and during the heating process.

The rotor assembly 200 is then heated 120 in a furnace sufficiently to cause the slugs 214 to braise to the bars 212. In one embodiment, the rotor assembly 200 is furnace-brazed in an atmosphere of 5% Hydrogen/95% Nitrogen (5% $H_2$/95% $N_2$) with a dew point at or above 25 degrees C. The 5% $H_2$ atmosphere provides a reducing environment that acts as flux to assure complete alloying of the Copper and Silver throughout the braze joints.

It can be helpful to ensure that the Hydrogen percentage of the furnace-brazing atmosphere not exceed 5% $H_2$ and the dew point be at or above 25 degrees C. Atmospheres with higher percentages of $H_2$ and the dew points lower than 25 degrees C. may attack the surface insulation of the laminations on the discs 210, which can significantly lower the surface insulation resistance increasing inter-laminar eddy current losses. Temperature may be measured at the point of the wires in the embodiment in which wires are used, or elsewhere in other embodiments.

The various forces applied as described above maintain the relative placement of the various components described above to maintain tight physical and electrical connections among them, while allowing for a limited amount of thermal expansion. If thermal expansion is not accommodated, the forces can cause the assembly to become misshapen in unpredictable ways. However, it can be helpful to have materials with a lower coefficient of thermal expansion used to apply forces, so as to tighten the assembly 200 as it is heated.

The rotor is then cooled 122 using a conventional annealing schedule. The collets 232 and collars 230, bolts, including bolt 220, springs and plates 222 used to apply the forces described above may be removed 124. Step 124 may include milling, sanding or otherwise shaping the now braised slugs 214 and bars 212, in order to shape them into a cylindrical shape. The milling can also remove the wires, which may braise onto the slugs 214 and bars 212.

One or more Beryllium-copper bands are heated 126 to expand them and slipped 128 over the slugs 214 so that as the bands cool, they will exert a radial force towards the axis of the rotor. The assembly is allowed to reach room temperature 136, compressing the one or more bands around the slugs 214. If desired, before the bands are slipped over the rotor assembly 200, as part of step 132, at least the ends of the rotor assembly 200 are shrunk by chilling them. As the temperatures of the bands and the rotor approach equilibrium in step 136, the bands are set onto the rotor assembly 200 with an interference fit.

The rotor assembly 200 can then be finished using conventional rotor components, and the finished rotor used to build 138 a conventional electric motor using conventional techniques. The electric motor including the rotor assembly 200 can be used to build 140 conventional products such as partially- or fully-electrically powered vehicles, such as electric or hybrid-electric automobiles, rockets, and the like.

What is claimed is:

1. A method of building at least a component of a rotor, comprising:
   stacking a plurality of discs, each disc comprising a plurality of teeth, to produce a stack of discs;
   adding, between a plurality of the teeth of each of the discs, a plurality of bars, at least some of the plurality of bars having a length longer than the height of the stack of discs;
   radially inserting, between each of at least some of the outer edges of the plurality of bars, a slug, wherein at least one of the slugs and the bars is coated with a braising material;
   applying a removable radial force to the slugs towards a center so as to compress faces of the slugs against faces of the bars;
   heating the slugs, plurality of bars and stack of discs to braise the slugs to the plurality of bars; and
   allowing the heated slugs, plurality of bars and stack of discs to cool.

2. The method of claim 1, additionally comprising adding a band around the cooled slugs.

3. The method of claim 1 wherein the slugs, plurality of bars and stack of discs to cool according to an annealing schedule.

4. The method of claim 1, wherein:
   the plurality of bars comprise copper;
   the slugs comprise copper; and
   at least some of the bars or slugs are plated with silver.

5. The method of claim 1, wherein the each of the plurality of teeth have a shape that has a width that is greater at an outer edge than a width of the said tooth inside the outer edge.

6. The method of claim 1, additionally comprising applying an axial force to the slugs to compress them against the stack of discs.

7. The method of claim 1, wherein the radial force allows at least a limited amount of thermal expansion of at least the slugs.

8. The method of claim 1, wherein the radial force is applied using at least one wire.

9. The method of claim 1, wherein the radial force is applied by radially wedging a removable piece towards a central axis of the at least the component of the rotor.

* * * * *